Patented Nov. 27, 1923.

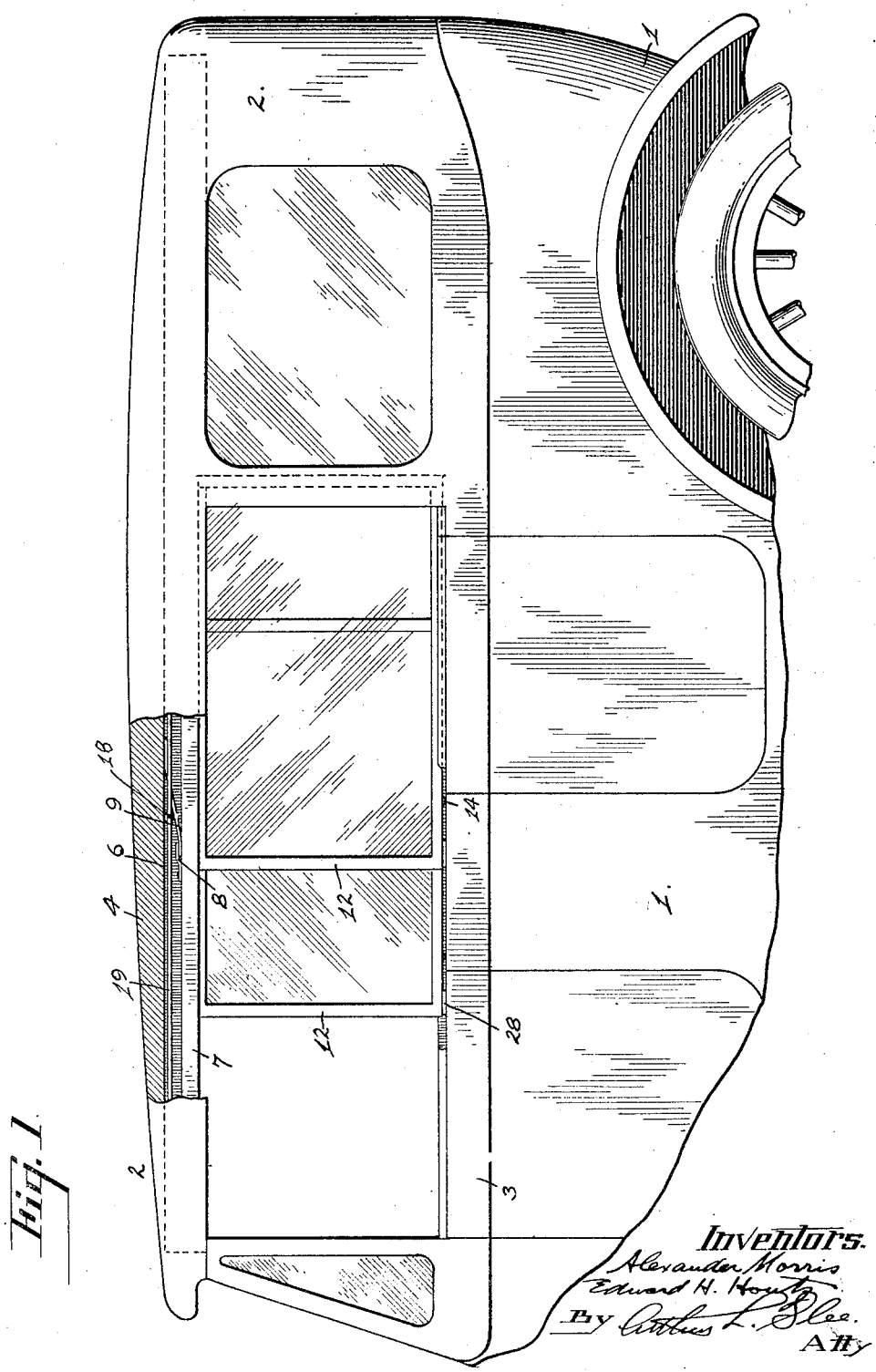

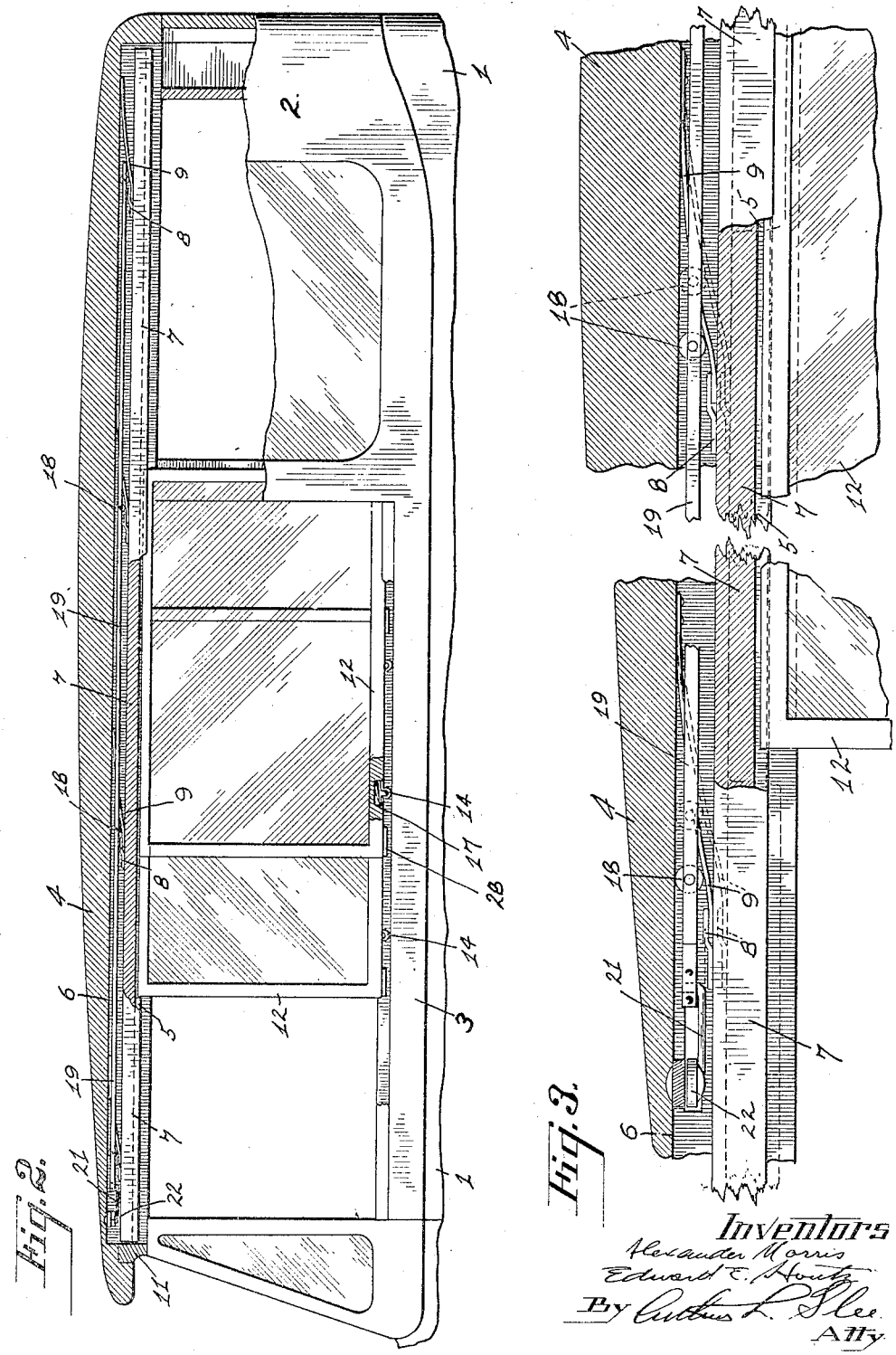

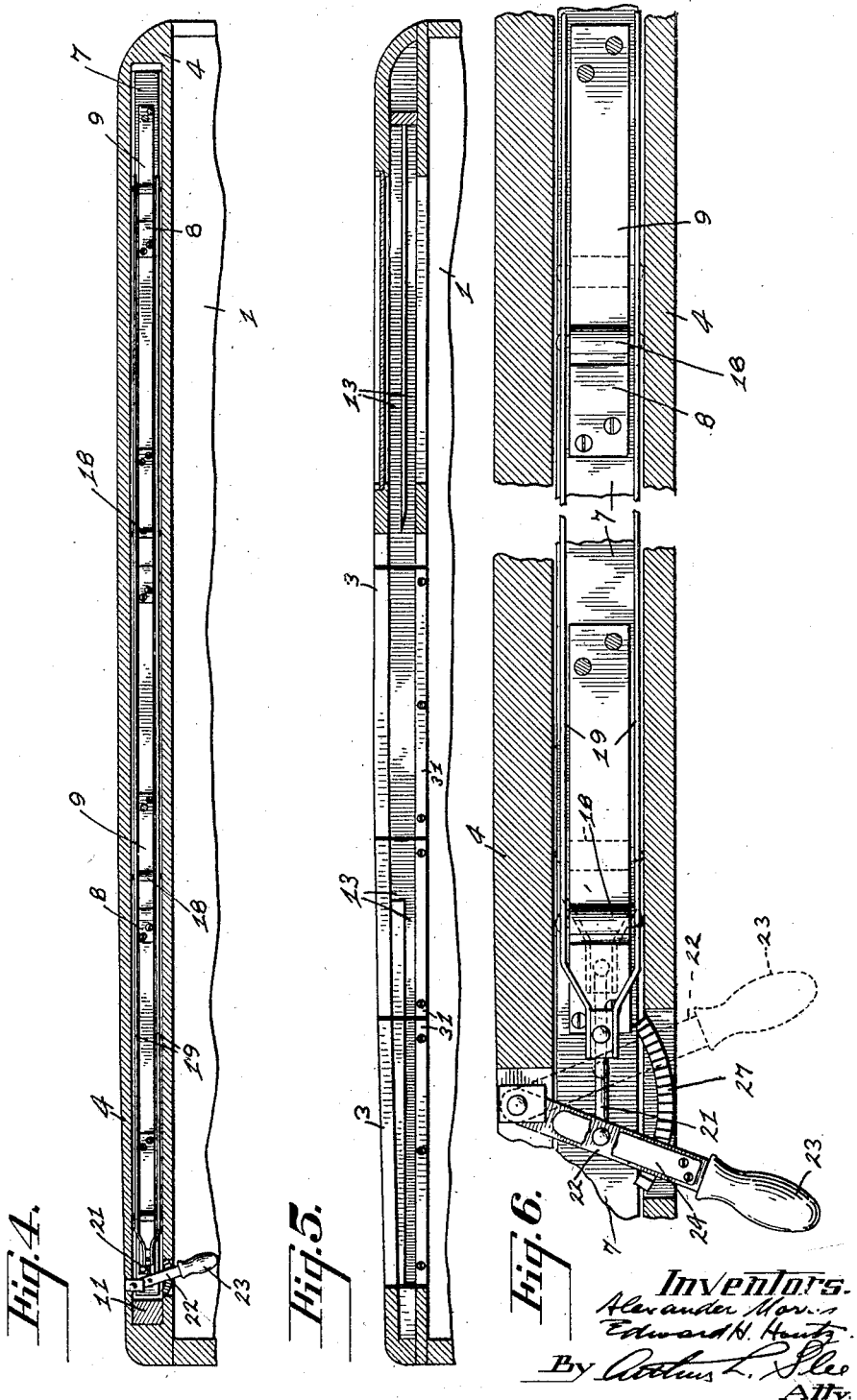

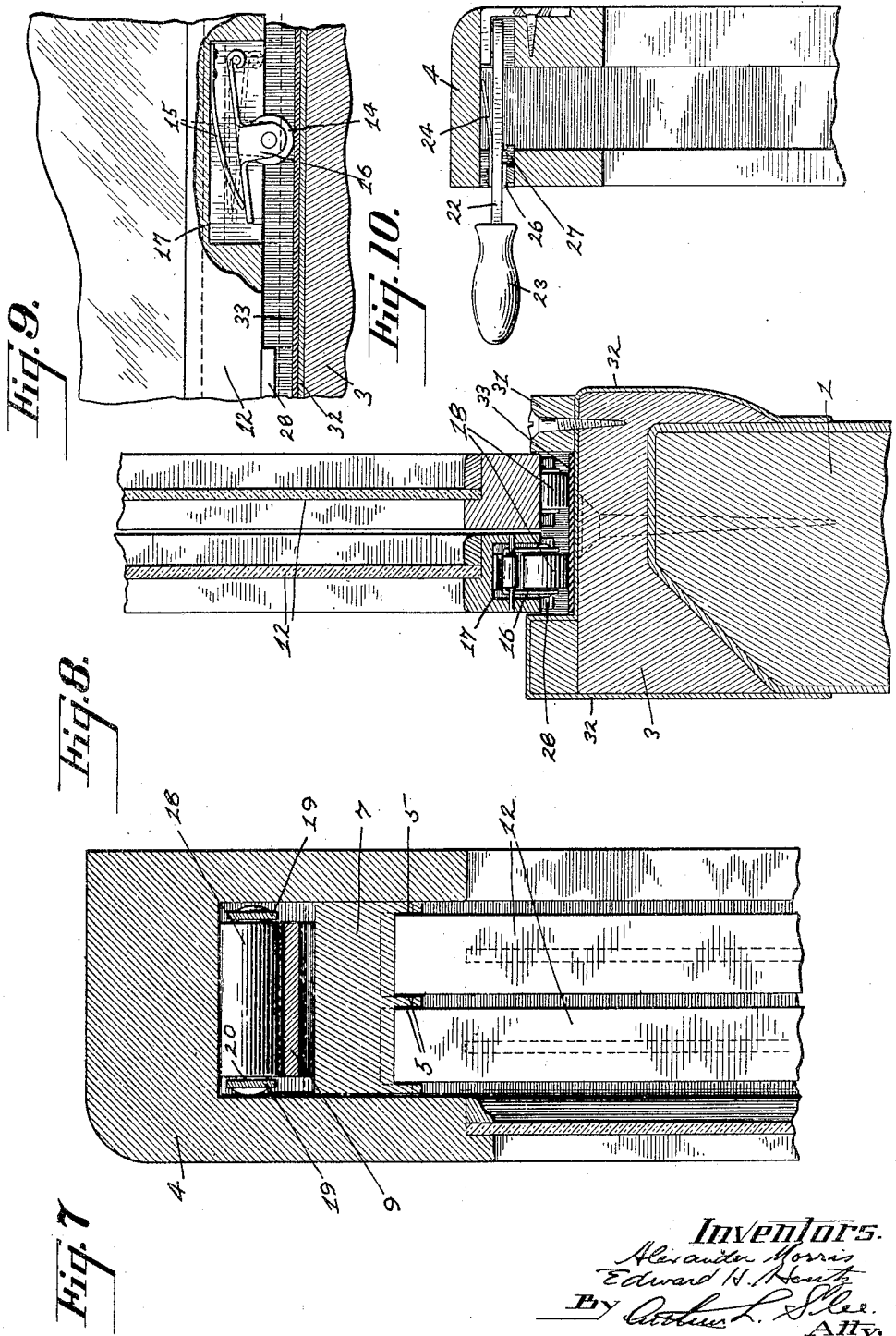

1,475,852

UNITED STATES PATENT OFFICE.

ALEXANDER MORRIS AND EDWARD H. HOUTZ, OF SAN FRANCISCO, CALIFORNIA.

MOTOR-VEHICLE TOP.

Application filed February 25, 1922. Serial No. 539,297.

*To all whom it may concern:*

Be it known that we, ALEXANDER MORRIS and EDWARD H. HOUTZ, citizens of the United States, residing in the city and county of San Francisco and State of California, have jointly invented a new and useful Improvement in a Motor-Vehicle Top, of which the following is a specification.

Our invention relates to improvements in tops for motor vehicles and the like wherein sidelights slidably mounted within the sides of a top are arranged to be moved and locked in any desired position.

The primary object of our invention is to provide an improved top arranged to be built upon the body of an open motor vehicle and characterized by a simplicity of construction facilitating the building and assembling of the top upon the vehicle, and affording a strength and ruggedness adapted to withstand long service.

Another object is to provide an improved locking means operating in connection with slidably mounted sidelights to permit the sidelights to be readily released and moved to any desired position and to effectively lock said sidelights in such position.

A further object is to provide means for taking up all wear, and all shrinkage or expansion of parts whereby the window may be firmly locked and all rattling of parts prevented at all times.

Another object is to provide an improved mounting for sidelights whereby the weight is supported upon receding rollers mounted within the lower edge of each sidelight and guided by tracks formed upon the lower top frame member along the edge of the body thus facilitating movement of the sidelights and permitting the sidelights to be more effectively locked against movement and rattling.

A still further object is to provide a construction, the operating parts of which may be readily removed for repair or replacement should any part be damaged after assembly upon the vehicle.

We accomplish these and other objects, appearing hereafter, by means of the device disclosed in the drawings forming a part of the present specification wherein like characters of reference are used to designate similar parts throughout said specification and drawings and in which, Fig. 1 is a broken side elevation of a motor vehicle showing our improved top built thereon, the sidelights being shown locked in a partially opened position.

Fig. 2 is a broken side elevation partly in section of the top shown in Fig. 1, the sidelights being shown in unlocked position to permit movement thereof.

Fig. 3 is a broken longitudinal section of an upper frame member shown upon a larger scale to disclose our improved locking means.

Fig. 4 is a horizontal longitudinal section of an upper frame member showing the manner in which the locking member is mounted therein.

Fig. 5 is a horizontal section through one side of the top to show the lower frame member and the sidelight receiving tracks.

Fig. 6 is an enlarged detail of the locking member actuating means, the releasing position being shown in full lines and the locked position in dotted lines.

Fig. 7 is a vertical cross section of an upper frame member.

Fig. 8 is a vertical cross section of a lower frame member.

Fig. 9 is a detail of the sidelight supporting roller and its operation, the normal position being shown in full lines and the receded position, assumed when the window is locked, being shown in dotted lines.

Fig. 10 is a vertical section of an upper frame member showing the actuating lever.

Referring to the drawings, the numeral 1 is used to designate the body of a motor vehicle upon which is built a top designated in general by the numeral 2. The top 2 is provided with lower side frame members 3 screwed or otherwise secured upon the top of the sides of the vehicle 1 as best shown in Fig. 8 of the drawings, and with the upper frame members 4 mounted in parallel spaced relation to the members 3.

The upper frame members 4 are rabbeted upon their under sides to form longitudinally disposed recesses 6 adapted to receive locking members 7 having clips 8 secured upon the upper side of the roof to removably engage leaf springs 9 secured within the inner portion of the recesses 6. We prefer to mount four springs 9 within each top frame member, said springs being approximately equally spaced between the ends of the member 4, and having their free ends slightly downwardly bent to permit the clips 8 to be moved to engage the ends of the springs 9 whereby the member 7 is supported. A removable block 11 is secured within the forward end of the recess 6 to normally prevent longitudinal movement of the member 7 within each upper frame member 4.

The under side of each locking member 7 is provided with a pair of parallel longitudinal grooves 5 each adapted to receive and engage the upper edge of a side light 12 slidably mounted between the upper and lower frame members.

The lower edges of the sidelights 12 are supported upon the lower frame members 3 and are guided by tracks 13 formed thereon. Rollers 14 rotatably mounted upon frames 16 pivotally mounted within recesses 17 formed within the lower edge of each sidelight 12, are normally actuated by springs 15 to extend outwardly beyond the edge of the sidelight to support the weight thereof upon the lower member 3, said rollers serving to reduce friction and facilitate the movement of the sidelights along the tracks 13.

Between each spring 9 and the upper frame member is mounted a roller 18 normally engaging the spring adjacent its free end. The rollers 18 within each upper frame member 4 are connected upon each side by links 19 carrying bearings 20 upon which the rollers 18 rotate. The forward ends of the links 19 within each member 4 are connected by a common link 21 to an operating lever 22 having one end pivotally mounted at the outer edge of the member 4, as best shown in Fig. 6 of the drawings, said lever being provided with a handle 23 extending inwardly to be operated by a person within the vehicle. A spring 24 is secured upon the top of the lever 22 to normally depress the same to hold a tooth 26 formed upon the underside thereof in engagement with a toothed rack 27. By means of the links 19 and 21 and the lever 22, the rollers 18 may be advanced between their respective springs 9 and the frame member 4 to depress the free end of said springs 9 and thus move the locking member 7 carried thereby into locking engagement with the sidelights 12. The amount of movement of the several rollers being equal, each will operate to wedge its spring downwardly an amount equal to each of the other springs thus exerting a uniform pressure along the entire length of the member 7, the pressure thus applied being sufficient to firmly lock the sidelight at any desired position along the tracks 13, and effectually preventing all rattling. The springs 9, while exerting a firm and steady pressure against the member 7 and hence against the side-lights 12, are sufficiently yieldable to afford a resilience designed to take up any excessive pressure due to racking of the body and top when the vehicle is traveling along a rough road. This feature of our invention we deem to be of especial importance as by resiliently securing the sidelights we prevent breakage of the glass of said sidelights and parting of the joints of the top due to the racking above mentioned, without impairing the firmness with which the sidelights are locked against movement and rattling.

The action of the springs 9 and roller 18 in locking the window is disclosed in Figs. 3, 6, 7. Fig. 9 shows the manner in which the rollers 14 are receded into the lower edge of the sidelights 12 when the member 7 is depressed against their upper edges, the sidelight being pressed downwardly against the pressure of the springs 15, to move pads 28 into firm frictional engagement with the lower frame member 3. When it is desired to release the sidelights to permit movement thereof to another position, the lever 22 is moved manually against the pressure of the spring 24 to cause the tooth 26 to disengage the rack 27, the lever 22 being then moved to recede the rollers 18 from between the springs 9 and the upper frame member, said springs being thus released to lift the member 7 out of locking engagement with the sidelights 12, the upper edges of the sidelights being, however, still engaged and guided by the grooves 5. When released from the pressure of the locking members 7, the sidelights 12 are lifted by the springs 15 and may be rolled freely along the tracks 13 to the extreme open or close positions or to any intermediate position.

In the above manner the sidelights may be adjusted to suit the desire of the occupants of the vehicle, the adjustment ranging from an entirely closed compartment to one having the sides entirely open.

The back and rearward ends of the sides together with the top covering are constructed in the usual manner and require no especial description as such construction is well known in the art.

As disclosed in the drawings, and previously mentioned in the specification, we have provided for the ready removal of all moving parts for repair or adjustment. Cleats 31 of finished material are screwed or otherwise secured upon one side of the lower frame member 3 to define one side of the track 13, said cleats 31 being secured outside of the upholstery 32 with which the remainder of the frame is covered, in this manner being readily detachable without disturbing the upholstery when it is desired to remove the sidelights from between the upper and lower frame members. The sidelights may now be advanced to a position matching with the removed portion of the cleat and moved outwardly at the bottom away from the frame member.

After removal of the side lights, if it is desired to obtain access to the springs 9 and rollers 18, the block 11 is removed and the member 7 moved longitudinally within the recess 6 to cause the clips 8 to disengage the springs 9, the member 7 being then readily removable from the frame member. However, the above mentioned springs and rollers seldom require attention, as any wear, or distortion of parts is compensated for by moving the lever 22 a greater or less degree as required and as all parts may be made of a rugged and durable construction, breakage will occur only under most unusual circumstances, one of our prime objects being to eliminate all delicate parts and adjustments.

The bottom of the tracks 13 are covered with a suitable lining 33, durable material, preferably of a character adapted to reduce noise caused by rolling the sidelights thereon, said lining 33 being subjected to all the wear from the rollers 14 and thus preventing wear upon the upholstery 32 with which the member 3 is covered. The member 3 is cut transversely to match with the door openings of the vehicle body to permit opening and closing of the doors in the usual manner.

Having thus described our invention, what we claim as new and desire to secure by Letters Patent is,

1. The combination with a motor vehicle, of a top built upon the body of said vehicle, said top having upper and lower frame members upon each side thereof; side-lights slidably mounted between the upper and lower frame members; springs secured within the upper frame members; guide members mounted within the upper frame members and engaged by the springs; a roller mounted between each spring and the upper frame members; and means for advancing the rollers simultaneously between the springs and the upper frame members to depress the springs and the guide members engaged thereby against the sidelights whereby said side-lights may be resiliently locked in any desired positions.

2. The combination with a motor vehicle, of a top built upon the body of said vehicle, said top having upper and lower frame members upon each side thereof; side-lights slidably mounted between the upper and lower frame members; springs secured within the upper frame members; guide members mounted within the upper frame members and engaged by the springs; a roller mounted between each spring and the upper frame members; means for advancing the rollers simultaneously between the springs and the upper frame members to depress the springs and the guide members engaged thereby against the sidelights whereby said side-lights may be resiliently locked in any desired positions; and means for securing said rollers in advanced position.

3. In a top for motor vehicles, upper frame members rabbeted upon their under sides; a plurality of leaf springs secured within each rabbet; an upper guide member removably engaged by the springs and supported thereby within the rabbet of each upper frame member; rollers mounted between each spring and the frame; and means for advancing the rollers between the springs and the frames to depress the springs and the guide members engaged thereby.

4. In a top for motor vehicles, upper frame members rabbeted upon their under sides; a plurality of leaf springs secured within each rabbet; an upper guide member removably engaged by the springs and supported thereby to normally permit free movement of side-lights slidably mounted thereunder; a roller mounted between each spring and its frame member; and means for advancing the rollers within each frame member simultaneously to depress the springs whereby the guide member is moved into locking relation with the side-lights.

In witness whereof, we hereunto set our signatures.

ALEXANDER MORRIS.
EDWARD H. HOUTZ.